Jan. 5, 1943.  H. C. TYLER ET AL  2,307,310
COTTON THINNING DEVICE
Filed April 7, 1941  3 Sheets-Sheet 1

Inventor

HERMAN C. TYLER
JOHN H. McELROY

By Clarence A. O'Brien

Attorney

Jan. 5, 1943.  H. C. TYLER ET AL  2,307,310
COTTON THINNING DEVICE
Filed April 7, 1941   3 Sheets-Sheet 2

Inventor
HERMAN C. TYLER
JOHN H. McELORY
By Clarence A. O'Brien
Attorney

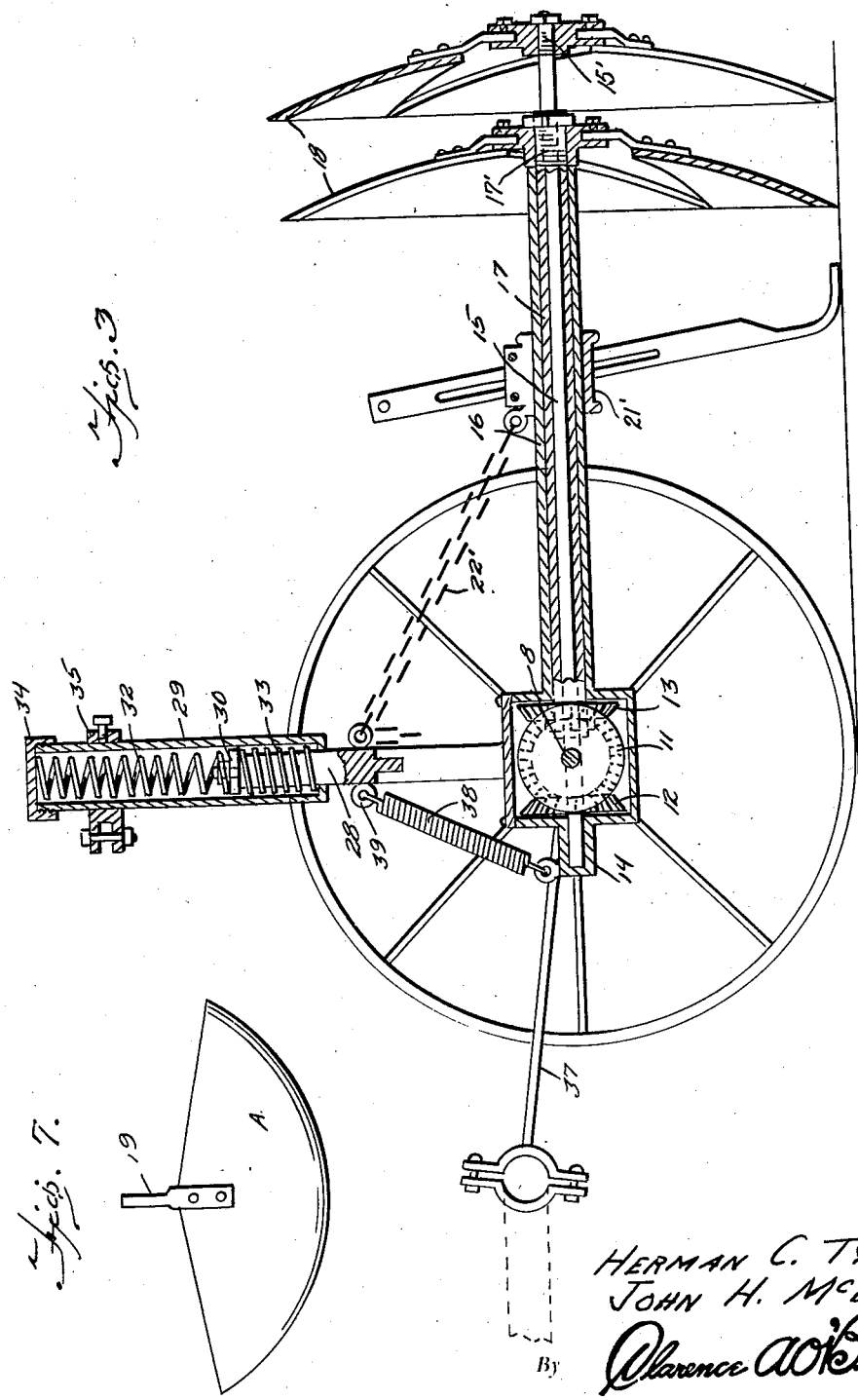

Patented Jan. 5, 1943

2,307,310

UNITED STATES PATENT OFFICE 2,307,310

COTTON THINNING DEVICE

Herman C. Tyler and John H. McElroy,
Lemoore, Calif.

Application April 7, 1941, Serial No. 387,306

3 Claims. (Cl. 97—15)

This invention relates to a cotton thinning device which may be coupled to a cultivator or some other similar agricultural machine to receive draft and partial support therefrom, and has for the primary object the provision of a device of this character which will not materially increase the amount of draft power necessary for its operation and the agricultural machine over that usually employed for said machine and will efficiently thin cotton and may be adjusted to increase and decrease the distance between the cotton plants left standing for growth into maturity.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which Figure 1 is a side elevation illustrating a cotton thinning device constructed in accordance with our invention.

Figure 3 is a vertical sectional view illustrating the device.

Figure 7 is a view in elevation illustrating one of the segments of the thinning discs.

Figure 1:
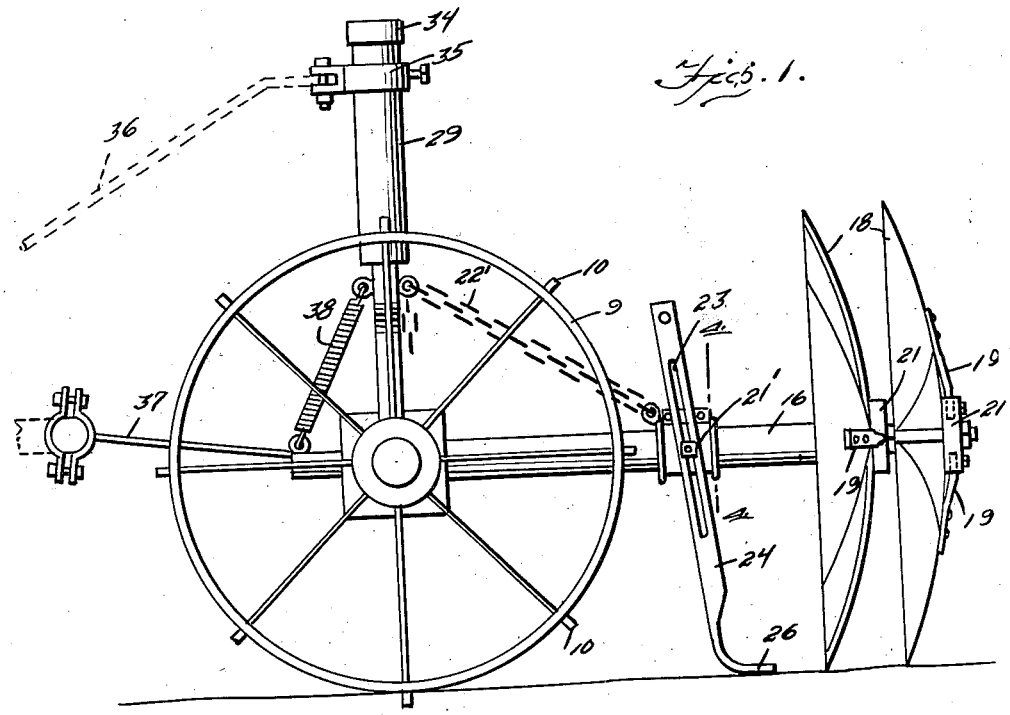
Figure 5:
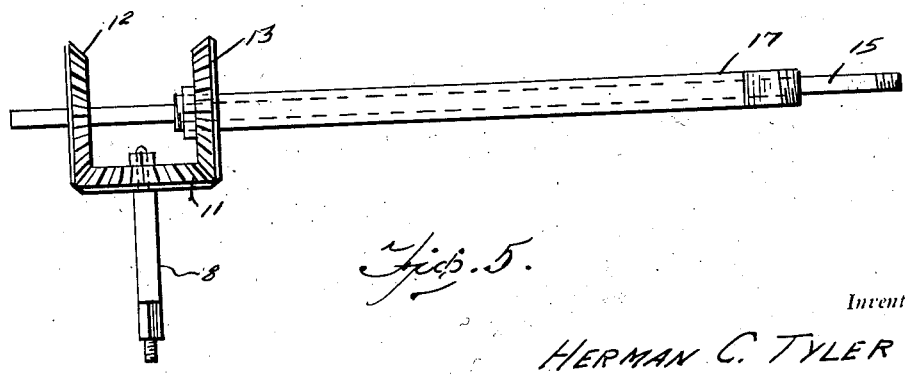
Figure 5 is a plan view illustrating the operating shafts for the thinning discs and the drive means therefor.
Figure 2:
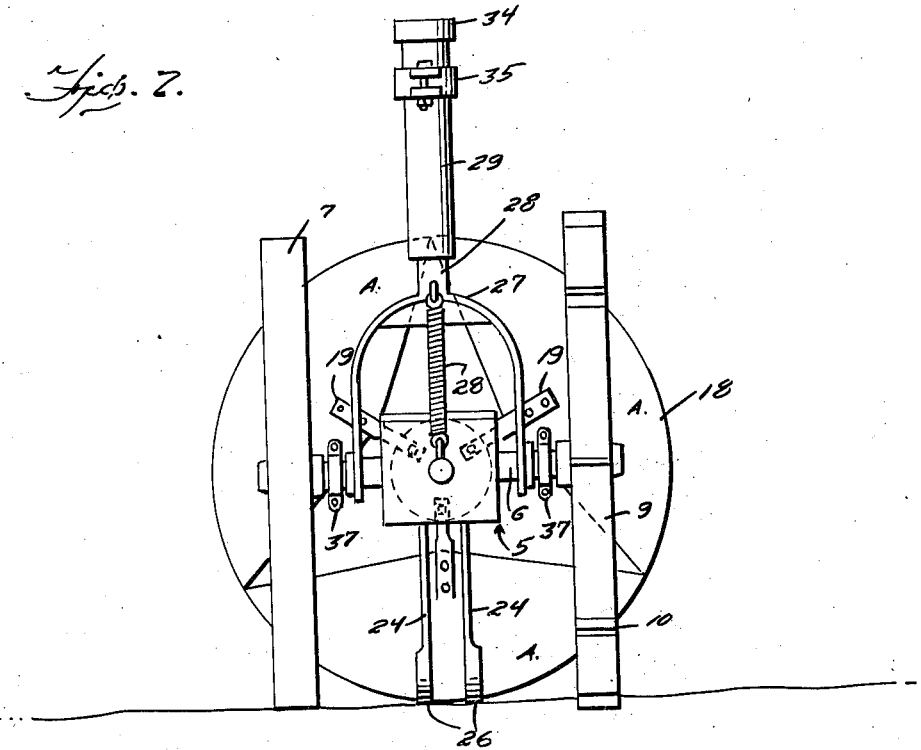
Figure 2 is a front elevation illustrating the device.
Figure 6:
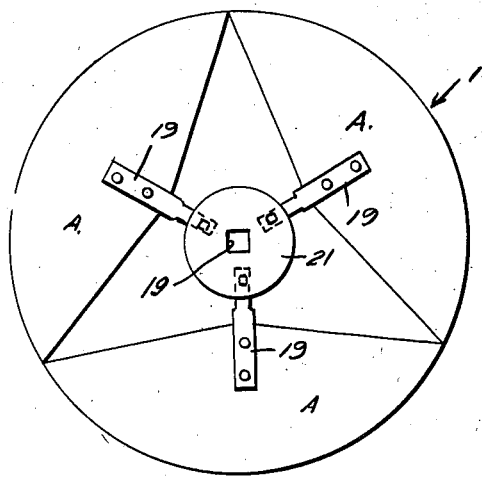
Figure 6 is a front elevation illustrating one of the thinning discs.
Figure 4:
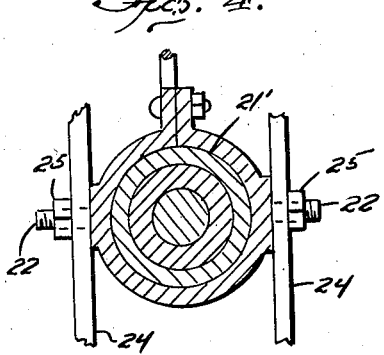
Figure 4 is a transverse sectional view taken on the line 4—4 of Figure 1.

Referring in detail to the drawings, the numeral 5 indicates a housing which is adapted to form a gear box and has extending from opposite sides thereof sleeve type journals 6, one of which has journaled thereon an idler type ground wheel 7 and the other has journaled therein a drive shaft 8, one end of which extends into the housing 5 and the opposite end has secured thereon a ground traction wheel 9 provided with cleats 10 arranged transversely of the periphery thereof and also arranged in spaced relation.

Arranged in the housing 5 and secured to the drive shaft is a beveled gear 11 to mesh with opposed beveled gears 12 and 13. The front wall of the housing 5 is provided with a bearing sleeve 14 to act as a pilot bearing for the forward end of a disc shaft 15 which extends entirely through the housing and an elongated bearing sleeve 16 formed integrally with the rear wall of the housing. The bearing sleeve 16 also rotatably supports a disc shaft 17 of hollow formation through which extends the disc shaft 15 and rotatably supports the latter. The forward end of the shaft 17 extends into the housing and has the gear 13 secured thereto. The shaft 15 extends a selected distance beyond the rear end of the hollow shaft 17.

Removably mounted on the rear ends of the shafts are thinning discs 18 which are rotated in reverse directions by the arrangement of the gears 11, 12 and 13 and are driven by the traction wheel 9 when the device is moved over the ground. The discs 18 are spaced a distance apart as clearly shown in Figure 3 and, as before stated, rotate in opposite directions, the purpose of which is to remove certain cotton growth leaving at selected distances apart standing cotton plants which are to mature in the field.

Each disc is of concavo convex shape, as shown in Figure 3, and is provided with a triangular shaped cutout portion, the apexes of which extend through the periphery of the disc to form the latter into segments, as indicated by the character A. Connected to the segments are brackets or arms 19 which in turn are adjustably connected to a hub 21. This arrangement of connection with the hub permits the discs to be adjusted toward and from each other for the purpose of varying the distance of the thinning action on a row of growing cotton.

The hub of one disc is secured on the shaft 17 while the other hub is secured on the shaft 15, the latter-named shaft extending through the former mentioned hub. The hubs 21 are provided with square openings, as at 19', to fit square parts 15', 17' on the shafts 15 and 17, respectively.

A cuff 21' is mounted on the bearing sleeve 16 forwardly of the thinning discs and has extending from opposite sides thereof screw threaded studs 22 which pass through slots 23 in gauge members 24. Nuts 25 are threaded onto the studs 22 against the gauge members for adjustably securing the latter on the bearing sleeve. The lower ends of the gauge members 24 are angularly disposed to form ground shoes 26 which ride upon the ground and thereby gauge the depth at which the thinning discs may operate in the soil.

Rotatably mounted on the bearing sleeve 16 is a substantially U-shaped yoke 27 having integral therewith a rod 28 which enters a cylinder 29. The rod 28 includes a head 30 operating in the cylinder and on which bear oppositely arranged springs 32 and 33. The cylinder is provided with a removable cap 34 to permit assembling of the head on the rod 28 as well as assembling the springs 32 and 33. The springs work in opposition to each other and act as shock absorbing mediums for any shock that is transferred from the ground wheels to the cylinder. A chain 22' connects the yoke 27 to the cuff 21'.

A collar 35 is adjustably mounted on the cylinder 29 and has detachably connected thereto a brace 36 which is in turn connected to a cultivator or some other similar agricultural implement. Also connected to the implement are towing members 37 which are in turn connected to the bearings sleeves 6. The towing members 37 are detachably connected to the sleeves 6 as well as to the towing device. This also applies to the brace 36.

A coil spring 38 is connected to the pilot bearing 14 and to an eye 39 on the rod 28. The purpose of the spring 38 is to act to urge the cutting discs toward the soil and the gauge shoes into engagement with the ground.

Thus it will be seen from the foregoing description and accompanying drawings that a very practical and efficient thinning device has been provided which may be employed for thinning various types of growth arranged in rows and which may be conveniently coupled and uncoupled to a towing device, such as a cultivator or some other type of agricultural implement.

Further, it will be seen that through the construction of the thinning discs they may be readily adjusted for varying the distances between the growth left standing after receiving a thinning operation.

While we have shown and described the preferred embodiment of our invention, it will be understood that minor changes in construction, combination and arrangement of parts may be made without departing from the spirit and scope of the invention as claimed.

Having thus described our invention, what we claim is:

1. In a cotton thinning device, a housing, a bearing sleeve on said housing, ground wheels supporting said housing, disc shafts journaled in said bearing sleeve and extending into said housing, thinning discs secured to said shafts, gearing means connecting said shafts, means for connecting one of said ground wheels to said gearing means for the rotation of the thinning discs by the latter-named ground wheel in opposite directions, and means for coupling the housing to a towing device, gauge members adjustably mounted on said bearing sleeve in advance of the thinning discs including ground engaging shoes, a cushioning device connected to said housing, means for connecting said cushioning device to the towing device, and a spring connected to the cushioning device and to the housing for urging the thinning discs toward the ground.

2. In a cotton thinning device, a housing, wheel journals on said housing, ground wheels journaled on said wheel journals, a bearing sleeve on said housing and extending rearwardly thereof, a hollow shaft journaled in said sleeve extending into said housing, a solid shaft journaled in the hollow shaft and extending into the housing and journaled therein and extending a selected distance beyond one end of the hollow shaft, gearing connecting said shafts for the rotation thereof in opposite directions and located in said housing, a driving means between the gearing and one of the ground wheels, towing means connected to said housing and adapted for connection to a towing device, a yoke mounted on said wheel journals, a rod formed on said yoke and having a removable head, a cylinder receiving a portion of said rod and the head, cushioning springs operating in opposition to each other in the cylinder and against the head, means for connecting said cylinder to the towing device, and thinning discs connected to said shafts, spring means between said housing and yoke for urging the discs toward the ground, and gauge elements adjustably connected to the bearing sleeve and including shoes to ride the surface of the ground in advance of the thinning discs.

3. In a cotton thinning device, a housing, wheel journals on said housing, ground wheels journaled on said wheel journals, a bearing sleeve on said housing and extending rearwardly thereof, a hollow shaft journaled in said sleeve extending into said housing, a solid shaft journaled in the hollow shaft and extending into the housing and journaled therein and extending a selected distance beyond one end of the hollow shaft, gearing connecting said shafts for the rotation thereof in opposite directions and located in said housing, a driving means between the gearing and one of the ground wheels, towing means connected to said housing and adapted for connection to a towing device, a yoke mounted on said wheel journals, a rod formed on said yoke and having a removable head, a cylinder receiving a portion of said rod and the head, cushioning springs operating in opposition to each other in the cylinder and against the head, means for connecting said cylinder to the towing device, and thinning discs connected to said shafts, spring means between said housing and yoke for urging the discs toward the ground, and gauge elements adjustably connected to the bearing sleeve and including shoes to ride the surface of the ground in advance of the thinning discs, each of said discs including a concavo convex disc provided with a central triangular shaped cutout portion extending through the periphery of said disc to form segments, and a hub adjustably connected to the segments whereby they may be adjusted relative to each other.

HERMAN C. TYLER.
JOHN H. McELROY.